United States Patent [19]

So

[11] Patent Number: 6,135,060
[45] Date of Patent: Oct. 24, 2000

[54] ANIMAL TRAINING DEVICE

[76] Inventor: Ho Yun So, Kwangjang Apt. 8dong 106ho, 28 bunj, Youido-Dong, Yongdungpo-Gu, Seoul, Rep. of Korea, 105-010

[21] Appl. No.: 09/233,149

[22] Filed: Jan. 19, 1999

[30] Foreign Application Priority Data

Feb. 19, 1998 [KR] Rep. of Korea .......................... 98-5231

[51] Int. Cl.$^7$ .................................................. A01K 15/02
[52] U.S. Cl. ........................ 119/720; 119/719; 340/573.3
[58] Field of Search .................................... 119/719, 720, 119/721, 859, 908; 340/573.3, 870.09, 870.28

[56] References Cited

U.S. PATENT DOCUMENTS

| | | | |
|---|---|---|---|
| 5,353,744 | 10/1994 | Custer ...................................... | 119/719 |
| 5,559,498 | 9/1996 | Westrick et al. ......................... | 119/721 |
| 5,601,054 | 2/1997 | So .......................................... | 119/718 |
| 5,605,116 | 2/1997 | Kim et al. .............................. | 119/720 |
| 5,666,908 | 9/1997 | So .......................................... | 119/720 |
| 5,769,032 | 6/1998 | Yarnall, Sr. et al. ................... | 119/721 |
| 5,815,077 | 9/1998 | Christiansen ............................ | 119/719 |
| 5,913,284 | 6/1999 | Van Curren et al. ................... | 119/720 |
| 6,019,066 | 2/2000 | Taylor ..................................... | 119/719 |

*Primary Examiner*—Peter M. Poon
*Assistant Examiner*—Elizabeth Shaw
*Attorney, Agent, or Firm*—Pollock, Vande Sande & Amernick R.L.L.P.

[57] ABSTRACT

An animal training device which is worn around the neck of an animal to apply at least one of an impulse wave and vibration to the animal. A transmission microprocessor performs an arithmetic operation with respect to security code number data, impulse wave level data and mode data and outputs a control signal containing the security code number data, impulse wave level data and mode data, as a result of the arithmetic operation. The control signal from the transmission microprocessor is modulated at a carrier wave and transmitted in the form of a radio signal through a transmitting antenna. The transmitted radio signal is received at a receiving antenna and demodulated for detection of the control signal therefrom. A reception microprocessor receives the detected control signal and checks whether the security code number data in the received control signal is the same as pre-stored security code number data. If the security code number data in the received control signal is the same as the pre-stored security code number data, the reception microprocessor generates at least one of a vibration control signal and impulse wave control signal in response to the impulse wave level data and mode data in the received control signal. Therefore, at least one of the impulse wave and vibration is applied to the animal to train it.

4 Claims, 5 Drawing Sheets

ANIMAL TRAINING DEVICE

BACKGROUND OF THE INVENTION

1. Field of the Invention

The present invention relates to an animal training device which is worn around the neck of an animal to apply at least one of an impulse wave and vibration to the animal, so as to train the animal while applying a stimulation thereto.

2. Description of the Prior Art

In general, animal training devices are attached to the neck of an animal or a portion of the body thereof to train the animal while applying an electrical stimulation thereto.

One such conventional device is shown in U.S. Pat. No. 5,666,908, filed by this applicant on Jul. 5, 1995 and issued thereto on Sep. 16, 1997.

Figure 1:
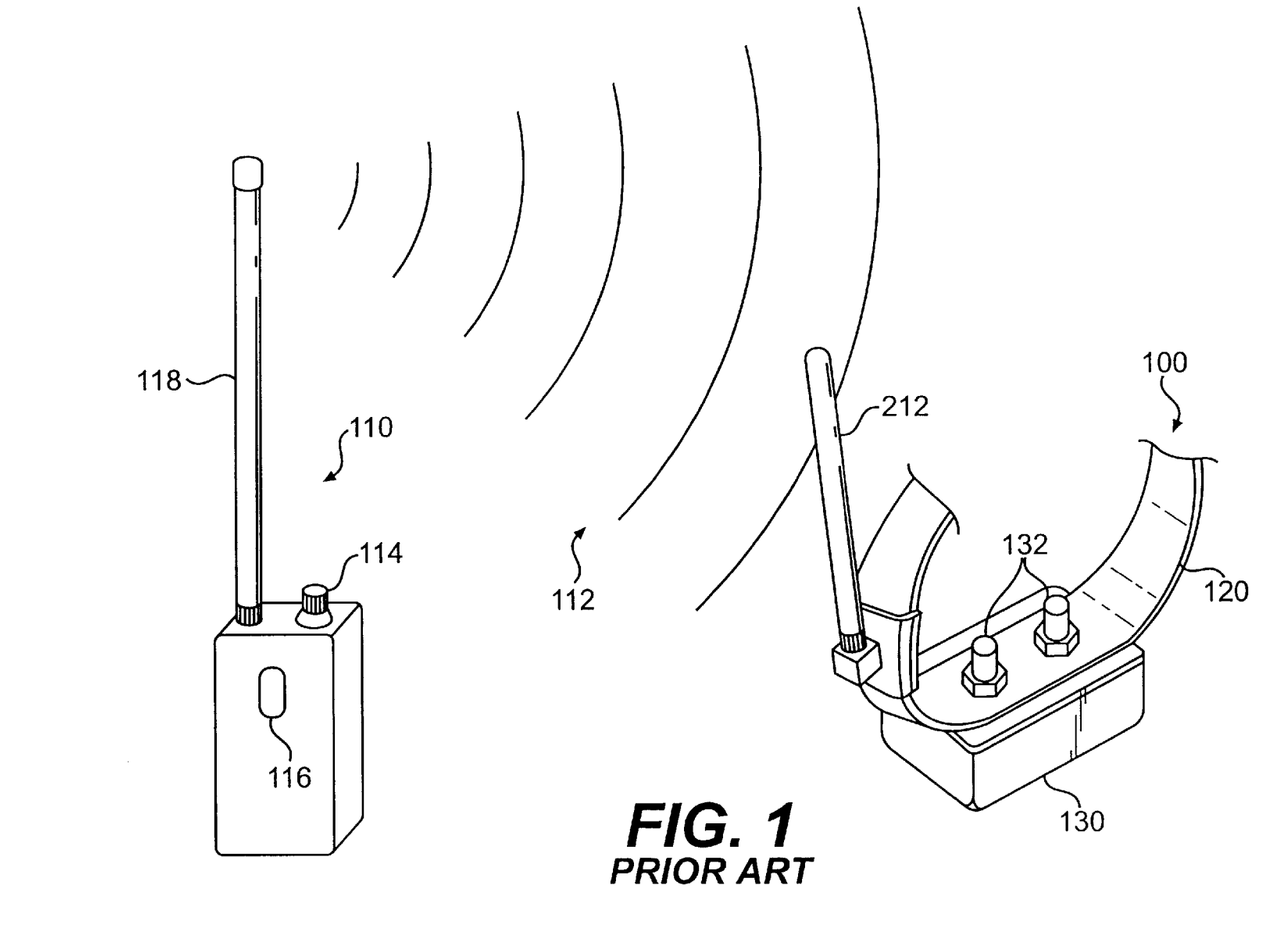
FIG. 1 is a perspective view of a conventional animal training device.

In the '908 patent, an animal training device comprises a transmitter 110 and a receiver 100, as shown in FIG. 1 herein.

The transmitter 110 is adapted to transmit a radio signal 112 according to an operation of a trainer training an animal to apply an electrical stimulation to the animal. To this end, the transmitter 110 comprises a stimulation adjust controller 114 for setting the level of an electrical stimulation to be generated by the receiver 100, in a radio signal 112 to be transmitted, a power switch 116 for controlling transmission of the radio signal 112, and a transmitting antenna 118 for transmitting the radio signal 112 therethrough. The transmitted radio signal 112 contains information regarding an indication of the stimulation level set by the stimulation adjust controller 114 and information regarding a security code for identifying a corresponding receiver 100.

The receiver 100 is adapted to receive the radio signal 112 transmitted through the transmitting antenna 118 of the transmitter 110 and generate the electrical stimulation of the level set by the stimulation adjust controller 114 of the transmitter 110 for a period of radio transmission time. To this end, the receiver 100 comprises a receiving antenna 212 for receiving the radio signal 112 transmitted through the transmitting antenna 118 of the transmitter 110, a receiver unit 130 for performing amplification and detection operations with respect to the radio signal 112 received through the receiving antenna 212 to generate the electrical stimulation of the level set by the stimulation adjust controller 114 of the transmitter 110, and a pair of electrodes 132 fixedly mounted on the inner surface of a collar 120 for applying the electrical stimulation generated by the receiver unit 130 to the animal.

The receiver unit 130 includes detection means for demodulating the radio signal 112 received through the receiving antenna 212, to detect, therefrom, information regarding the security code and the stimulation level set by the stimulation adjust controller 114 of the transmitter 110, a reception microprocessor for checking whether an output signal from the detection means is that intended by the trainer and outputting a stimulation control signal corresponding to the stimulation level set by the stimulation adjust controller 114 of the transmitter 110 if the output signal from the detection means is that intended by the trainer, amplification means switched in response to the stimulation control signal from the reception microprocessor to perform an amplification operation, and stimulation generation means for generating a high voltage according to the amplification operation of the amplification means and applying the generated high voltage as the electrical stimulation to the animal through the electrodes 132.

In the above-mentioned conventional animal training device, however, because only the electrical stimulation is generated at the electrodes of the receiver under the control of the transmitter, it is difficult to train animals oversensitive to the electrical stimulation.

SUMMARY OF THE INVENTION

Therefore, the present invention has been made in view of the above problem, and it is an object of the present invention to provide an animal training device which is attached to an animal to apply at least one of a high-voltage impulse wave and vibration to the animal, so as to train the animal while applying a stimulation thereto.

In accordance with the present invention, the above and other objects can be accomplished by a provision of an animal training device having a transmitter for transmitting a command of a trainer training an animal, in the form of a radio signal, through a transmitting antenna, and a receiver worn around the neck of the animal via a collar for receiving the radio signal transmitted by the transmitter through a receiving antenna and applying an impulse wave of a desired level to the animal, wherein the transmitter comprises security code setting means for setting a security code number; an impulse wave adjustment selector switch for setting the level of the impulse wave to be applied to the animal; mode selection means for selecting any one of vibration, vibration/impulse wave and impulse wave modes to apply at least one of the impulse wave of the level set by the impulse wave adjustment selector switch and a vibration to the animal; a first function switch for setting the receiver to output at least one of the impulse wave and vibration in the mode selected by the mode selection means for a period of radio transmission time; a second function switch for setting the receiver to output only the impulse wave for a period of predetermined time; a transmission microprocessor for performing an arithmetic operation with respect to security code number data from the security code setting means, impulse wave level data from the impulse wave adjustment selector switch and mode data from the mode selection means in response to an output signal from the first or second function switch and outputting a control signal containing the security code number data, impulse wave level data and mode data, as a result of the arithmetic operation; modulation means for modulating the control signal from the transmission microprocessor at a carrier wave; and radio frequency amplification means for amplifying an output signal from the modulation means to a radio frequency level to generate the radio signal to be transmitted to the receiver; and wherein the receiver comprises amplification means for amplifying the radio signal received through the receiving antenna; filtering means for filtering an output signal from the amplification means to remove a noise component therefrom; detection means for demodulating an output signal from the filtering means to detect the control signal from the transmission microprocessor of the transmitter therefrom; a reception microprocessor for receiving the control signal detected by the detection means, checking whether the security code number data contained in the received control signal is the same as pre-stored security code number data and generating at least one of a vibration control signal and impulse wave control signal in response to the impulse wave level data and mode data contained in the received control signal if the security code number data in the received control signal is the same as the pre-stored security code number data; a buffer for amplifying the impulse wave control signal from the reception microprocessor to a predetermined level; a transistor turned on in response to an output signal from the buffer; high voltage generation means connected to a collector terminal of the transistor for transforming a low voltage into a high voltage and applying the transformed high voltage as the impulse wave to the animal through a pair of electrodes; and motor driving means for driving a vibration motor in response to the vibration control signal from the reception microprocessor to apply the vibration to the animal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

The embodiment of the present invention will now be described in detail with reference to the accompanying drawings.

Figure 2:
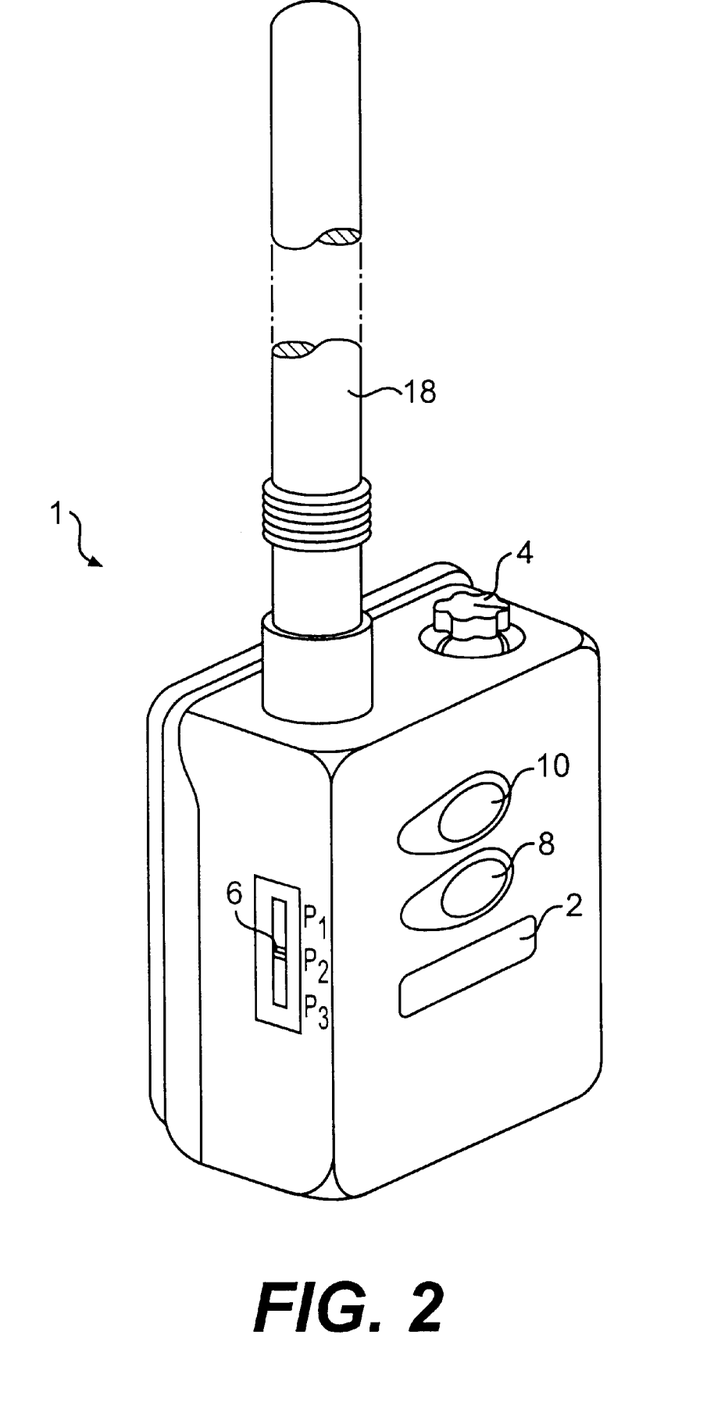
FIG. 2 is a perspective view of a transmitter in an animal training device in accordance with an embodiment of the present invention.
Figure 3:
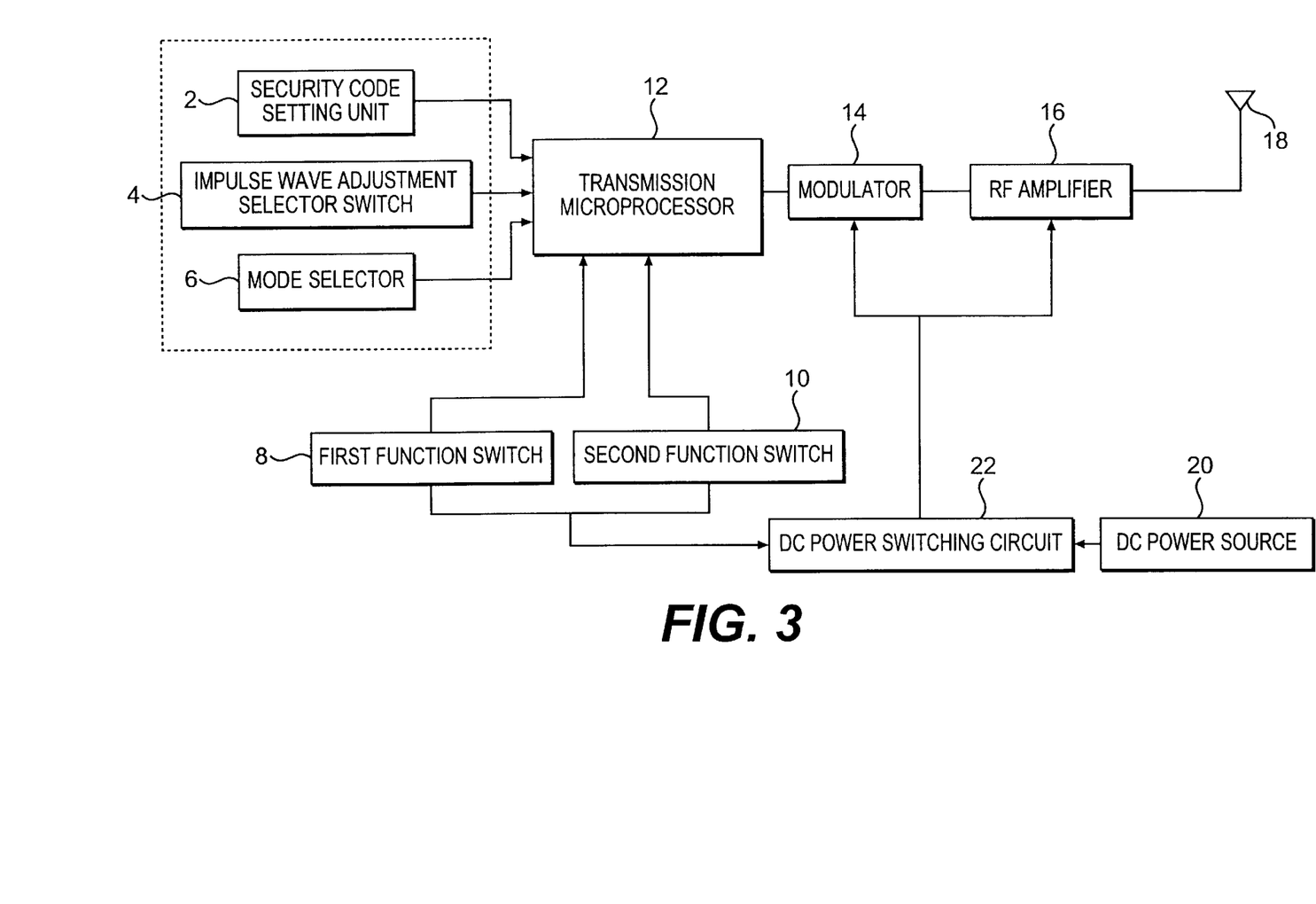
FIG. 3 is a functional block diagram of the transmitter in FIG. 2.
Figure 4:
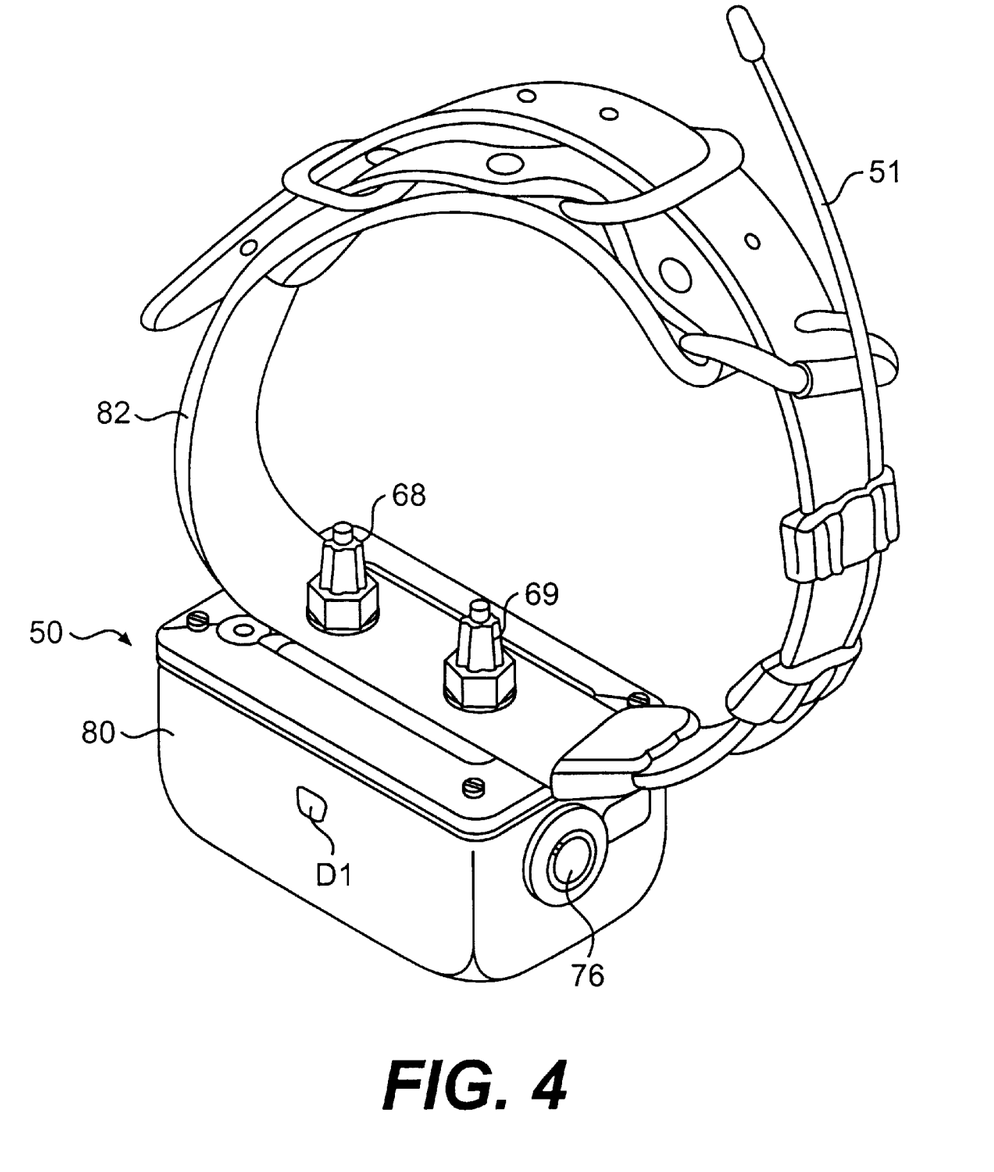
FIG. 4 is a perspective view of a receiver in the animal training device in accordance with the embodiment of the present invention.
Figure 5:
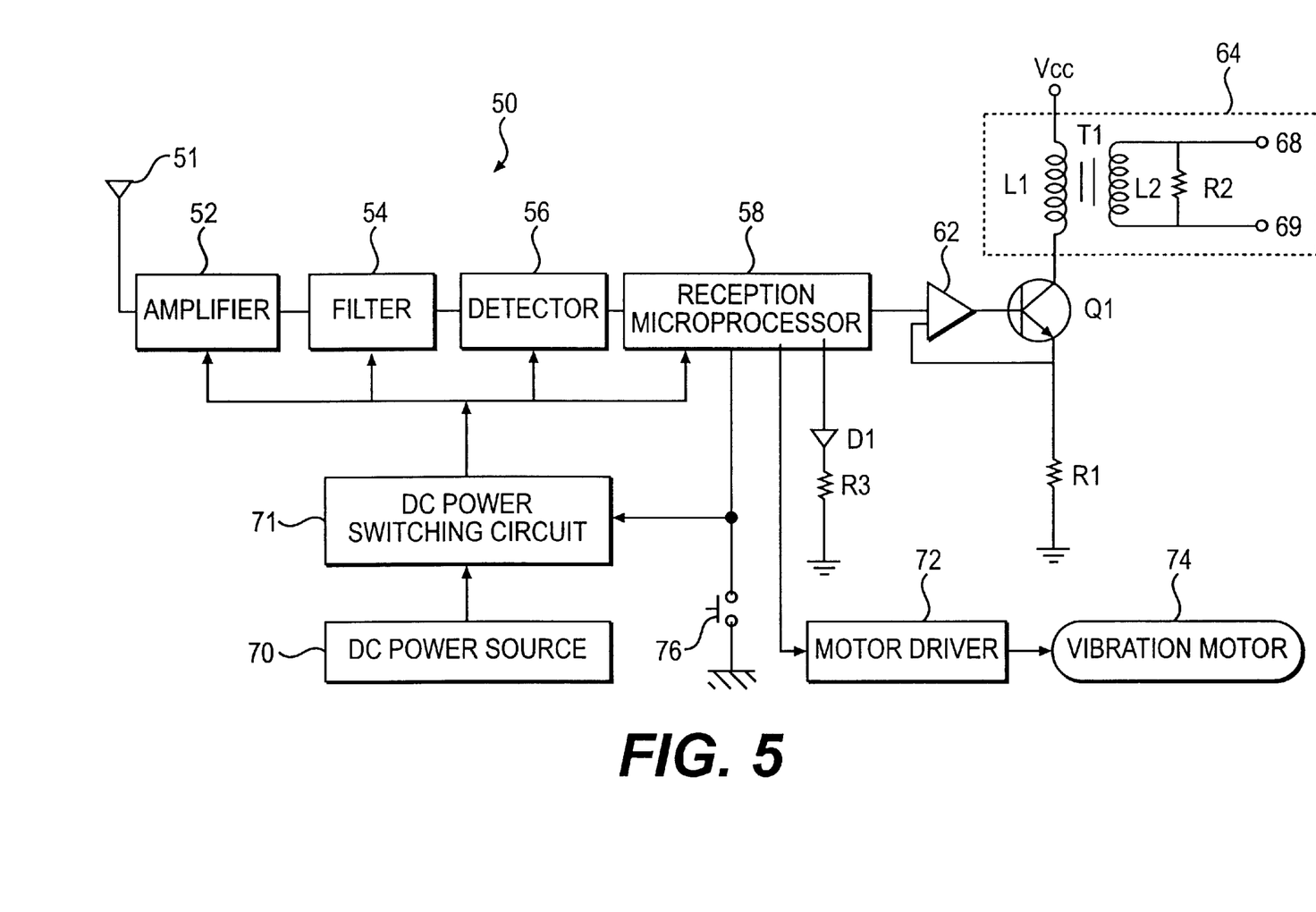
FIG. 5 is a functional block diagram of the receiver in FIG. 4.

FIG. 2 is a perspective view of a transmitter in an animal training device in accordance with an embodiment of the present invention, FIG. 3 is a functional block diagram of the transmitter in FIG. 2, FIG. 4 is a perspective view of a receiver in the animal training device in accordance with the embodiment of the present invention, and FIG. 5 is a functional block diagram of the receiver in FIG. 4.

As shown in FIGS. 2 and 4, the animal training device comprises a transmitter 1 for transmitting a command of a trainer training an animal, in the form of a radio signal, through a transmitting antenna 18, and a receiver 50 mounted on an animal's collar 82 for receiving the radio signal transmitted by the transmitter 1 through a receiving antenna 51 and applying at least one of an impulse wave of a desired level and a vibration to the animal.

As shown in FIGS. 2 and 3, the transmitter 1 comprises a security code setting unit 2 for setting a security code number, an impulse wave adjustment selector switch 4 for setting the level of the impulse wave to be applied to the animal, and a mode selector 6 for selecting any one of vibration, vibration/impulse wave and impulse wave modes to allow the receiver 50 to apply at least one of the impulse wave of the level set by the impulse wave adjustment selector switch 4 and the vibration to the animal.

The transmitter 1 further comprises a first function switch 8 for setting the receiver 50 to output at least one of the impulse wave and vibration in the mode selected by the mode selector 6 for a period of radio transmission time, and a second function switch 10 for setting the receiver 50 to output only the impulse wave for a period of predetermined time (for example, 0.4 sec). A transmission microprocessor 12 is provided to perform an arithmetic operation with respect to security code number data from the security code setting unit 2, impulse wave level data from the impulse wave adjustment selector switch 4 and mode data from the mode selector 6 in response to an output signal from the first or second function switch 8 or 10 and output a control signal containing the security code number data, impulse wave level data and mode data, as a result of the arithmetic operation. A modulator 14 is provided to modulate the control signal from the transmission microprocessor 12 at a carrier wave. A radio frequency (RF) amplifier 16 is provided to amplify an output signal from the modulator 14 to an RF level to generate the radio signal to be transmitted to the receiver 50. The transmitting antenna 18 is adapted to transmit the radio signal generated by the RF amplifier 16 therethrough. A direct current (DC) power switching circuit 22 is provided to supply DC power from a DC power source 20 as operating power to the transmission microprocessor 12, modulator 14 and RF amplifier 16 in response to the output signal from the first or second function switch 8 or 10.

As shown in FIGS. 4 and 5, the receiver 50 comprises the receiving antenna 51 for receiving the radio signal transmitted through the transmitting antenna 18 of the transmitter 1, an amplifier 52 for amplifying the radio signal received by the receiving antenna 51, a filter 54 for filtering an output signal from the amplifier 52 to remove a noise component therefrom, and a detector 56 for demodulating an output signal from the filter 54 to detect the control signal from the transmission microprocessor 12 of the transmitter 1 therefrom. A reception microprocessor 58 is provided to receive the control signal detected by the detector 56, check whether the security code number data contained in the received control signal is the same as pre-stored security code number data and generate at least one of a vibration control signal and impulse wave control signal in response to the impulse wave level data and mode data contained in the received control signal if the security code number data in the received control signal is the same as the pre-stored security code number data. A buffer 62 is provided to amplify the impulse wave control signal from the reception microprocessor 58 to a predetermined level.

The receiver 50 further comprises a transistor Q1 turned on in response to an output signal from the buffer 62, a high voltage generator 64 connected to a collector terminal of the transistor Q1 for transforming a low voltage Vcc from a Vcc voltage terminal into a high voltage and applying the transformed high voltage as the impulse wave to the animal through a pair of electrodes 68 and 69, and a motor driver 72 for driving a vibration motor 74 in response to the vibration control signal from the reception microprocessor 58 to apply the vibration to the animal.

Alternatively, a pivot motor may be used instead of the vibration motor 74. A light emitting diode D1 is connected at its anode to the reception microprocessor 58 to indicate that the impulse wave control signal is outputted from the reception microprocessor 58. The light emitting diode D1 is also connected at its cathode to a ground voltage source through a resistor R3.

A power switch 76 is installed on a case 80 of the receiver 50 to operate a DC power switching circuit 71 to supply DC power from a DC power source 70 as operating power to the amplifier 52, filter 54, detector 56 and reception microprocessor 58. The light emitting diode D1 is installed on a side wall of the case 80 to indicate that the high-voltage impulse wave generated by the high voltage generator 64 is applied to the animal.

Preferably, the security code setting unit 2 is an electrically erasable and programmable read only memory (EEPROM) or dip switch. The high voltage generator 64 includes a transformer T1 with primary and secondary coils L1 and L2. The primary coil L1 of the transformer T1 has its one side connected to the Vcc voltage terminal and its other side connected to the collector terminal of the transistor Q1. The secondary coil L2 of the transformer T1 is adapted to boost a voltage across the primary coil L1 to a predetermined level. The electrodes 68 and 69 are connected respectively to both sides of an output resistor R2 which is, in turn, connected in parallel to the secondary coil L2 of the transformer T1.

In the preferred embodiment of the present invention, the impulse wave adjustment selector switch 4 is a mechanical switch for controlling the impulse wave level by steps.

The transistor Q1 has an emitter terminal feedback-connected to an input terminal of the buffer 62, to allow the high voltage generator 64 to stably generate the impulse wave regardless of an ambient temperature.

The operation of the animal training device with the above-mentioned construction in accordance with the embodiment of the present invention will hereinafter be described in detail.

First, the power switch 76 is pushed to operate the DC power switching circuit 71 to supply the DC power from the DC power source 70 to the receiver 50.

Then, assume that the mode selector 6 is set to a vibration position P1 under the condition that a security code number is set by the security code setting unit 2 and the level of an impulse wave to be applied to the animal is set by the impulse wave adjustment selector switch 4.

Upon pushing the first function switch 8, the transmission microprocessor 12 receives security code number data from the security code setting unit 2, impulse wave level data from the impulse wave adjustment selector switch 4 and mode data from the mode selector 6 in response to an output signal from the first function switch 8.

Then, the transmission microprocessor 12 performs an arithmetic operation with respect to the received data and outputs a control signal as a result of the arithmetic operation to the modulator 14. At this time, the control signal from the transmission microprocessor 12 contains the security code number data, impulse wave level data and mode data.

The modulator 14 modulates the control signal from the transmission microprocessor 12 at a carrier wave so that it can be transmitted through the transmitting antenna 18. The RF amplifier 16 amplifies an output signal from the modulator 14 to an RF level and transmits the resultant radio signal through the transmitting antenna 18.

The output signal from the first function switch 8 is also applied to the DC power switching circuit 22, which then supplies the DC power from the DC power source 20 as operating power to the transmission micrprocessor 12, modulator 14 and RF amplifier 16.

The radio signal (particularly containing the security code number data, impulse wave level data and mode data) transmitted through the transmitting antenna 18 of the transmitter 1 is received by the receiving antenna 51 of the receiver 50 and amplified by the amplifier 52. Then, the filter 54 filters an output signal from the amplifier 52 to remove a noise component therefrom. The detector 56 demodulates an output signal from the filter 54 to detect the control signal from the transmission microprocessor 12 of the transmitter 1 therefrom. Then, the control signal detected by the detector 56 is fed to the reception microprocessor 58.

The reception microprocessor 58 checks whether the security code number data contained in the received control signal is the same as pre-stored security code number data. If the security code number data in the received control signal is the same as the pre-stored security code number data, the reception microprocessor 58 generates a vibration control signal in the form of a square wave in response to the mode data contained in the received control signal. Then, the motor driver 72 drives the vibration motor 74 in response to the vibration control signal from the reception microprocessor 58 to apply a vibration to the animal. As a result, the trainer can train the animal while applying only the vibration thereto.

Next, assume that the mode selector 6 is set to a vibration/impulse wave position P2 under the condition that a security code number is set by the security code setting unit 2 and the level of an impulse wave to be applied to the animal is set by the impulse wave adjustment selector switch 4. Upon pushing the first function switch 8, the transmission microprocessor 12 receives security code number data from the security code setting unit 2, impulse wave level data from the impulse wave adjustment selector switch 4 and mode data from the mode selector 6 in response to an output signal from the first function switch 8.

Then, the transmission microprocessor 12 performs an arithmetic operation with respect to the received data and outputs a control signal as a result of the arithmetic operation to the modulator 14. At this time, the control signal from the transmission microprocessor 12 contains the security code number data, impulse wave level data and mode data.

The modulator 14 modulates the control signal from the transmission microprocessor 12 at a carrier wave so that it can be transmitted through the transmitting antenna 18. The RF amplifier 16 amplifies an output signal from the modulator 14 to an RF level and transmits the resultant radio signal through the transmitting antenna 18.

The output signal from the first function switch 8 is also applied to the DC power switching circuit 22, thereby allowing the DC power switching circuit 22 to supply the DC power from the DC power source 20 as operating power to the transmission micrprocessor 12, modulator 14 and RF amplifier 16.

Thereafter, the radio signal (particularly containing the security code number data, impulse wave level data and mode data) transmitted through the transmitting antenna 18 of the transmitter 1 is received by the receiving antenna 51 of the receiver 50 and amplified by the amplifier 52. The filter 54 filters an output signal from the amplifier 52 to remove a noise component therefrom. The detector 56 demodulates an output signal from the filter 54 to detect the control signal from the transmission microprocessor 12 of the transmitter 1 therefrom. Then, the control signal detected by the detector 56 is fed to the reception microprocessor 58.

The reception microprocessor 58 checks whether the security code number data contained in the received control signal is the same as pre-stored security code number data. If the security code number data in the received control signal is the same as the pre-stored security code number data, the reception microprocessor 58 generates a vibration control signal in the form of a square wave in response to the mode data contained in the received control signal. Then, the motor driver 72 drives the vibration motor 74 in response to the vibration control signal from the reception microprocessor 58 to apply a vibration to the animal.

At the same time, in response to the impulse wave level data and mode data contained in the received control signal, the reception microprocessor 58 generates an impulse wave control signal which is then amplified to a predetermined level by the buffer 62 and applied as a bias voltage to a base terminal of the transistor Q1 to turn on the transistor Q1.

As the transistor Q1 is turned on, current from the Vcc voltage terminal flows through the primary coil L1 of the transformer T1 in the high voltage generator 64, transistor Q1 and resistor R1, thereby causing a high-voltage impulse wave to be generated in the secondary coil L2 of the transformer T1. Then, the generated impulse wave is outputted at the electrodes 68 and 69 through the output resistor R2. As a result, the trainer can train the animal while applying both the impulse wave and vibration thereto.

Next, assume that the mode selector 6 is set to an impulse wave position P3 under the condition that a security code number is set by the security code setting unit 2 and the level of an impulse wave to be applied to the animal is set by the impulse wave adjustment selector switch 4. Upon pushing the first function switch 8, the transmission microprocessor 12 receives security code number data from the security code setting unit 2, impulse wave level data from the impulse wave adjustment selector switch 4 and mode data from the mode selector 6 in response to an output signal from the first function switch 8.

Then, the transmission microprocessor 12 performs an arithmetic operation with respect to the received data and outputs a control signal as a result of the arithmetic operation to the modulator 14. At this time, the control signal from the transmission microprocessor 12 contains the security code number data, impulse wave level data and mode data.

The modulator 14 modulates the control signal from the transmission microprocessor 12 at a carrier wave so that it can be transmitted through the transmitting antenna 18. The RF amplifier 16 amplifies an output signal from the modulator 14 to an RF level and transmits the resultant radio signal through the transmitting antenna 18.

The output signal from the first function switch 8 is also applied to the DC power switching circuit 22, which then supplies the DC power from the DC power source 20 as operating power to the transmission micrprocessor 12, modulator 14 and RF amplifier 16.

The radio signal (particularly containing the security code number data, impulse wave data and mode data) transmitted through the transmitting antenna 18 of the transmitter 1 is received by the receiving antenna 51 of the receiver 50 and amplified by the amplifier 52. Then, the filter 54 filters an output signal from the amplifier 52 to remove a noise component therefrom. The detector 56 demodulates an output signal from the filter 54 to detect the control signal from the transmission microprocessor 12 of the transmitter 1 therefrom. Then, the control signal detected by the detector 56 is supplied to the reception microprocessor 58.

The reception microprocessor 58 checks whether the security code number data contained in the received control signal is the same as pre-stored security code number data. If the security code number data in the received control signal is the same as the pre-stored security code number data, the reception microprocessor 58 generates an impulse wave control signal in response to the impulse wave level data and mode data contained in the received control signal.

The impulse wave control signal from the reception microprocessor 58 is amplified to a predetermined level by the buffer 62 and applied as a bias voltage to the base terminal of the transistor Q1 to turn on the transistor Q1.

With the transistor Q1 turned on, current from the Vcc voltage terminal flows through the primary coil L1 of the transformer T1 in the high voltage generator 64, transistor Q1 and resistor R1, thereby causing a high-voltage impulse wave to be generated in the secondary coil L2 of the transformer T1. Then, the generated impulse wave is outputted at the electrodes 68 and 69 through the output resistor R2. As a result, the trainer can train the animal while applying only the impulse wave thereto. At this time, the light emitting diode D1 connected to the reception microprocessor 58 is turned on to indicate that the high-voltage impulse wave is outputted at the electrodes 68 and 69 of the high voltage generator 64.

On the other hand, in the case where the second function switch 10 is pushed, the animal training device of the present invention is operated in the same manner as in the case where the impulse wave is generated and applied to the animal at the electrodes 68 and 69. In other words, if the second function switch 10 is pushed, the impulse wave is generated by the high voltage generator 64 for the predetermined time period (0.4 sec) according to the security code number data from the security code setting unit 2 and the impulse wave level data from the impulse wave adjustment selector switch 4 and applied to the animal through the electrodes 68 and 69 to train the animal. In this case, the entire operation is performed regardless of the operation of the mode selector 6. The output signal from the second function switch 10 is also applied to the DC power switching circuit 22, thereby allowing the DC power switching circuit 22 to supply the DC power from the DC power source 20 as operating power to the transmission micrprocessor 12, modulator 14 and RF amplifier 16.

In the disclosed embodiment of the present invention, if the security code number data in the radio signal received at the receiving antenna 51 of the receiver 50 is not the same as the security code number data pre-stored in the reception microprocessor 58, the receiver 50 is not operated.

Further, in the case where the first function switch 8 is pushed under the condition that a security code number is set by the security code setting unit 2, the level of an impulse wave to be applied to the animal is set by the impulse wave adjustment selector switch 4 and the mode selector 6 is set to any one of the vibration position P1, vibration/impulse wave position P2 and impulse wave position P3, at least one of the vibration and impulse wave is applied to the animal for a period of radio transmission time to train it.

In the case where the second function switch 10 is pushed, the impulse wave from the electrodes 68 and 69 is applied to the animal for the predetermined time period (for example, 0.4 sec) to train it. The predetermined time period can be varied by changing a resistance or capacitance of a time constant setting circuit of the reception microprocessor 58, not shown.

As apparent from the above description, according to the present invention, in the case where the first function switch is pushed under the condition that a security code number is set by the security code setting unit, the level of an impulse wave to be applied to the animal is set by the impulse wave adjustment selector switch and the mode selector is set to any one of the vibration position, vibration/impulse wave position, impulse wave position, the receiver receives a radio signal containing such data and thus applies at least one of the vibration and impulse wave to the animal to train it. In the case where the second function switch is pushed, only the impulse wave is applied to the animal for the predetermined time period according to the security code number data from the security code setting unit and the impulse wave level data from the impulse wave adjustment selector switch to train it.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An animal training device having a transmitter for transmitting a command of a trainer training an animal, in the form of a radio signal, through a transmitting antenna, and a receiver worn around the neck of the animal via a collar for receiving said radio signal transmitted by said transmitter through a receiving antenna and applying an impulse wave of a desired level to the animal, wherein said transmitter comprises:

security code setting means for setting a security code number;

an impulse wave adjustment selector switch for setting the level of said impulse wave to be applied to the animal;

mode selection means for selecting any one of vibration, vibration/impulse wave and impulse wave modes to apply at least one of said impulse wave of the level set by said impulse wave adjustment selector switch and a vibration to the animal;

a first function switch for setting said receiver to output at least one of said impulse wave and vibration in the mode selected by said mode selection means for a period of radio transmission time;

a second function switch for setting said receiver to output only said impulse wave for a period of predetermined time;

a transmission microprocessor for performing an arithmetic operation with respect to security code number data from said security code setting means, impulse wave level data from said impulse wave adjustment selector switch and mode data from said mode selection means in response to an output signal from said first or second function switch and outputting a control signal containing said security code number data, impulse wave level data and mode data, as a result of the arithmetic operation;

modulation means for modulating said control signal from said transmission microprocessor at a carrier wave; and radio frequency amplification means for amplifying an output signal from said modulation means to a radio frequency level to generate said radio signal to be transmitted to said receiver; and wherein said receiver comprises:

amplification means for amplifying said radio signal received through said receiving antenna;

filtering means for filtering an output signal from said amplification means to remove a noise component therefrom;

detection means for demodulating an output signal from said filtering means to detect said control signal from said transmission microprocessor of said transmitter therefrom;

a reception microprocessor for receiving said control signal detected by said detection means, checking whether said security code number data contained in the received control signal is the same as pre-stored security code number data and generating at least one of a vibration control signal and impulse wave control signal in response to said impulse wave level data and mode data contained in the received control signal if said security code number data in the received control signal is the same as the pre-stored security code number data;

a buffer for amplifying said impulse wave control signal from said reception microprocessor to a predetermined level;

a transistor turned on in response to an output signal from said buffer;

high voltage generation means connected to a collector terminal of said transistor for transforming a low voltage into a high voltage and applying the transformed high voltage as said impulse wave to the animal through a pair of electrodes; and motor driving means for driving a vibration motor in response to said vibration control signal from said reception microprocessor to apply said vibration to the animal.

2. An animal training device as set forth in claim 1, wherein said security code setting means is a dip switch.

3. An animal training device as set forth in claim 1, wherein said transistor has an emitter terminal feedback-connected to an input terminal of said buffer, to perform a stable operation regardless of a temperature variation.

4. An animal training device as set forth in claim 1, wherein said security code setting means is an EEPROM.

* * * * *